Patented June 12, 1928.

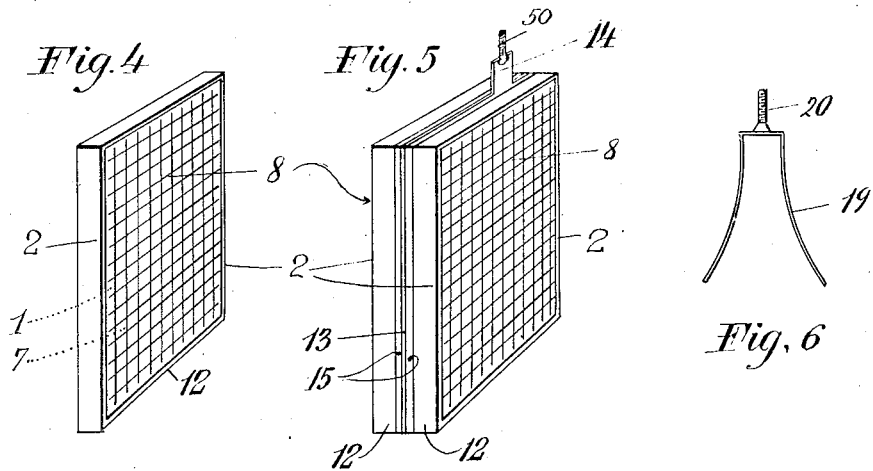
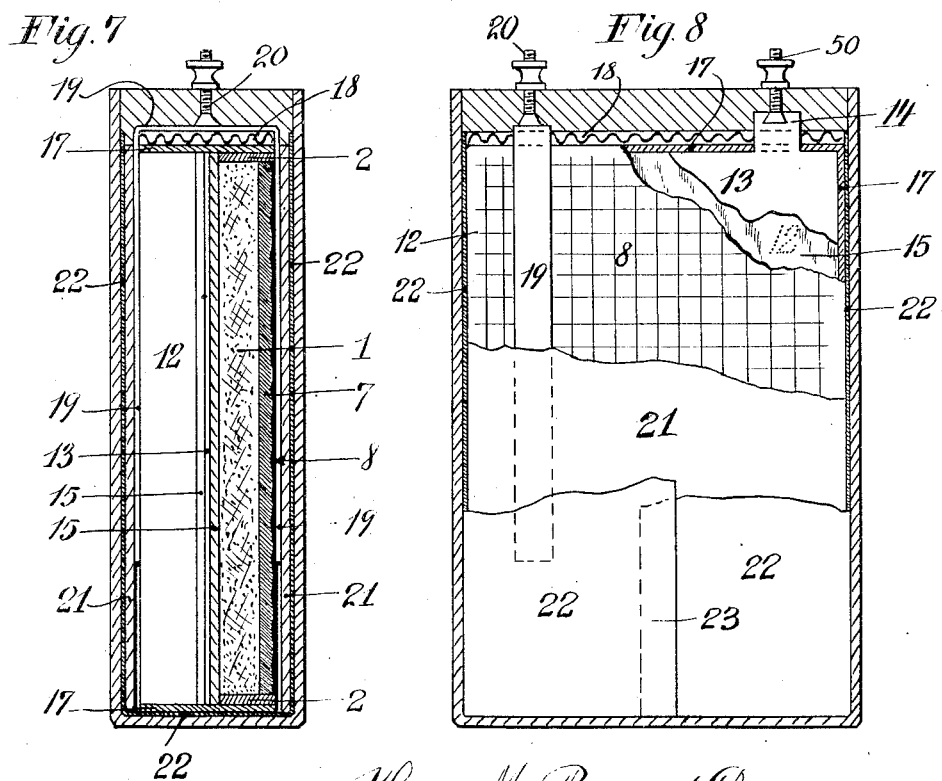

1,673,400

UNITED STATES PATENT OFFICE.

HENRY M. ROSENDAL DAM, OF ASTORIA, NEW YORK, ASSIGNOR TO JOSEPH BLOCK, OF BROOKLYN, NEW YORK.

ELECTRIC BATTERY.

Application filed September 23, 1924. Serial No. 739,278.

This invention relates to electric batteries of the type commonly known as dry cells or dry batteries. The object of my invention is to provide a generally improved dry battery which shall be superior in service and economic to manufacture. Accordingly my invention is embodied in a dry battery constructed and arranged as hereinafter set forth and as illustrated in the accompanying drawings in which Figures 1, 2 and 3 illustrate certain steps in the method of making a positive plate unit embodied in my invention.

Figure 4 is a perspective view of a completed positive plate unit.

Figure 5 is a perspective view of a cell or battery showing two positive plates assembled with one negative plate.

Figure 6 is a view of the connector for the two positive plates.

Figures 7 and 8 are views at right angles to each other showing a completed battery or single cell with parts broken away and parts omitted and in section.

My improved electric battery consists of one negative element and two positive elements so arranged and combined that the three elements together form a single unit. To this end I arrange the negative element between the two positive elements so as to utilize both sides of the negative element, and I use all the elements in plate form.

The battery according to my invention consists of a central negative element, for instance a zinc plate, on both sides of which I place a positive element in the form of a positive plate unit consisting of a depolarizing mixture, a layer of graphite or other suitable material and a conducting coating applied to the graphite layer. In this manner I utilize both sides of the zinc plate with a corresponding increase in the service of the battery as is obvious.

In manufacturing a single cell, for the battery herein shown, I proceed as follows: As a first step a suitable depolarizing mixture is prepared consisting for instance of suitable proportions of manganese, graphite and sal ammoniac, which is moistened to energize the elements and for the purpose of making the same plastic for compression purposes.

Figure 1:
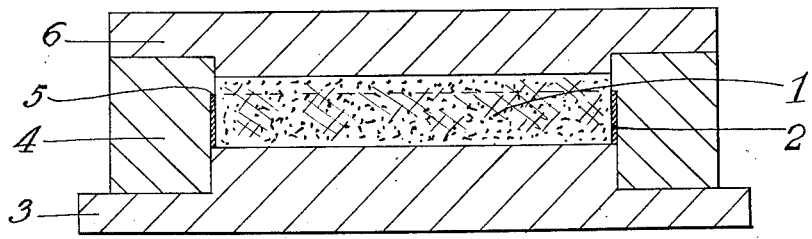
Figure 2:
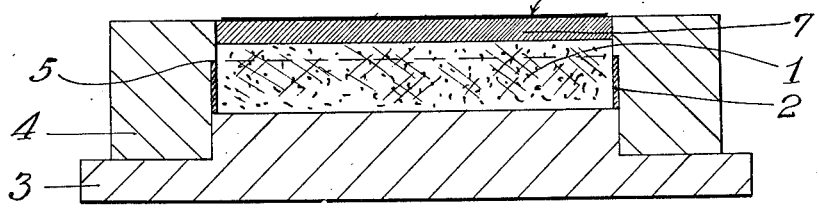

The mixture 1, see Figure 1, is placed within a frame 2 of nonconducting material, such as waxed card board, which frame is seated within a die comprising a base 3 and a female die member 4 which is undercut as at 5 to receive the frame 2. The die is filled with the depolarizing mixture 1 to the full height of the die member 4 after which the mixture is partly compressed by means of a male die 6 such as is shown in Figure 1. The male die member 6 is then removed and the space above the compressed depolarizing mixture is filled with a layer of graphite 7 which has been treated with wax or rosin to make it impervious. The impregnated layer of graphite is then heated (with a blow torch for instance) so that when the layer is compressed as will be explained hereinafer, the graphite layer will form a plate impervious to moisture, with all its pores closed, yet without impairing the conductivity of the plate, which forms the positive element of the battery.

Figure 3:
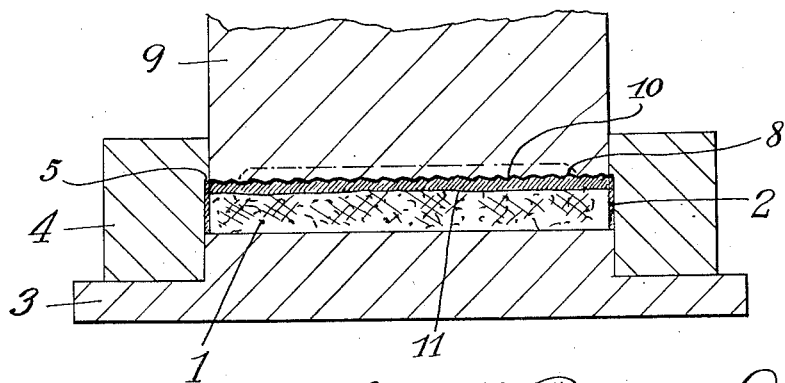

After the graphite has been heated, I place thereon a sheet of metallic foil, tin foil for instance, marked 8 and while the graphite is still hot, the die is placed in a press having a plunger 9, see Figure 3, which enters the die under heavy pressure and compresses the foil 8, the graphite layer 7 and the depolarizing mixture 1 into one solid plate in which all the elements are in close intimate contact with each other. To insure this result, the plunger 9 is preferably scored or provided with an uneven surface 10 which as the plunger descends into the die presses the foil into intimate contact with the graphite as shown in Figure 3. The uneven line 11 in this figure also indicates the close contact between the graphite and the depolarizing mixture.

It is not essential that the graphite layer be heated before placing the foil thereon. The same result may be accomplished by merely placing the foil on the graphite and then using a heated plunger 9 for final compression.

Thereafter the plunger is withdrawn, the die removed from the press and taken apart. The compressed plate is taken out. The result of the foregoing operations is a positive plate unit 12, Figure 4, consisting of the aforesaid three elements contained within a nonconducting frame 2 and ready for use in the battery. Two of these positive plate units are prepared for the battery which is then built as follows.

A zinc plate 13 having a connector tab 14 is provided, as is also two pulp board plates 15, 15 which have been suitably moistened and pasted on both sides with a suitable electrolytic paste. The parts are assembled to form a battery as shown in Figure 5 where it will be seen that the zinc 13 is placed centrally or between the two pulp boards 15, 15 and outside the latter are placed the two positive plate units 12, 12 with the conducting coating 8 on the outside. These parts are then pressed together by any suitable means with the result that the pasted boards 15 bind the elements together into one battery structure with all parts in close contact.

At this stage of this disclosure it will be seen that I have provided an electric battery in the form of a unitary structure consisting of one negative element and two positive elements adapted for use the moment the two positive elements are connected.

To prepare the thus completed battery for practical commercial use, the four narrow sides of the battery structure in Figure 5 are dipped in hot wax 17 to close the seams or joints between adjacent parts of the unitary structure. When wax 17 has cooled I place on top thereof a piece of corrugated card board 18 to provide the usual air spaces within the finished battery, the board being slit at one end to permit the connector tab 14 of the zinc to project therethrough as will be understood from Figure 8.

The two positive plate units 12, 12 are then connected by means of a conducting spring clip 19 such as shown in Figure 6. The clip is pressed down over the battery as shown in Figure 7 and contacts with the two foil sides of the units 12 to connect the same. The clip carries a terminal 20. Two card board plates or pieces 21, 21 are placed on the outside of the clip as shown and the battery is then wrapped in waterproofed or waxed paper 22.

The paper 22 is wrapped tightly around the battery and the joint 23, Figure 8, is quickly closed with a hot iron or suitable implement. The paper completely encloses the battery except on the top and serves to prevent leakage of moisture from the battery, also it serves to bind the parts together and presses the cardboards 21 tightly against the connector clip to insure good contact as is obvious. The boards 21 prevents the ends of the clip from tearing the paper. The battery is then placed within a box or container 24 and the top sealed with sealing wax or pitch 25, through which project the terminal 20 from the positive elements and a similar terminal 50 from the zinc connector tab 14.

As seen from Figures 7 and 8 there is thus provided a very compact, relatively small, yet very efficient dry battery ready for use. The active parts are all in intimate contact and suitable insulation has been provided to prevent internal leakage or short circuits. The service of the battery is superior because both sides of the zinc are used and the economy in manufacture is thus considerable. The method of manufacture is simple and requires no expensive apparatus. It lends itself readily to quantity production because of the ease and rapidity with which the several component parts may be prepared in quantities in advance of final assembly.

While I have disclosed my invention in its preferred form, changes may of course be made from the exact construction shown without departing from the principle of the invention and within the scope of the appended claims.

I claim:—

1. A unitary battery structure adapted to be assembled exteriorly of and thereafter introduced into a container and comprising a central electrode in plate form, an electrolyte carrier positioned upon each face of said electrode and coated on each side with an electrolytic material in paste form, a cake of depolarizing material positioned upon each of said carriers and united with said central electrode by said electrolytic material, and a flat electrode positioned upon each of said cakes of depolarizing material and intimately united thereto in a face-to-face relation.

2. A unitary battery structure adapted to be assembled exteriorly of and thereafter introduced into a container and comprising a central electrode in plate form, an electrolyte carrier positioned upon each face of said electrode and coated on each side with an electrolytic material in paste form, a plate unit positioned upon each of said electrolyte carriers and consisting of depolarizing material in cake form, and a flat electrode positioned upon said depolarizing material, said central electrode, electrolyte carriers and plate unit being intimately united in a face-to-face relation by said electrolytic material.

3. A unitary battery structure adapted to be assembled exteriorly of and thereafter introduced into a container and comprising a central electrode in plate form, an electrolyte carrier positioned upon each face of said electrode and coated on each side with an electrolytic material in paste form, a plate unit positioned upon each of said electrolyte carriers and consisting of a frame, depolarizing material in cake form carried within said frame, and a flat electrode carried within said frame and positioned upon said depolarizing material, said central electrode, electrolyte carriers and plate units being intimately united in a face-to-face relation by said electrolytic material.

4. A unitary battery structure adapted to be assembled exteriorly of and thereafter introduced into a container and comprising a central electrode in plate form, an electrolyte carrier positioned upon each face of said electrode and coated on each side with an electrolytic material in paste form, plate units adapted to be individually assembled as unitary structures and thereafter positioned upon said electrolyte carriers, each of said plate units consisting of a frame, depolarizing material in cake form carried within said frame, and a flat electrode carried within said frame and positioned upon said depolarizing material, said central electrode, electrolyte carriers and plate units being intimately united in a face-to-face relation by said electrolytic material.

5. A unitary battery structure adapted to be assembled exteriorly of and thereafter introduced into a container and comprising a central electrode in plate form, an electrolyte carrier positioned upon each face of said electrode and carrying electrolytic material, a plate unit positioned upon each of said electrolyte carriers and consisting of depolarizing material in cake form, and a flat electrode positioned upon said depolarizing material, said central electrode, electrolyte carriers and plate units being intimately united in a face-to-face relation, the margins of said central electrode, electrolyte carriers and plate units being coated with a waterproofing material whereby said unitary structure is sealed against the ingress and egress of moisture.

6. A unitary battery structure adapted to be assembled exteriorly of and thereafter introduced into a container and comprising a central electrode in plate form, electrolyte carriers coated on their opposite sides with an electrolytic paste and adhesively attached to opposite faces of said electrode by said paste, a plate unit positioned upon each of said carriers and adhesively attached to said carriers by said electrolytic paste, each of said units consisting of a frame, depolarizing material in cake form carried within said frame and positioned upon said carrier, a flat electrode in cake form positioned upon said depolarizing material, and a conductor in the form of a yoke engaging the second named electrodes and electrically connecting the same to each other.

HENRY M. ROSENDAL DAM.